United States Patent [19]
Dinkjian et al.

[11] Patent Number: 5,608,887
[45] Date of Patent: *Mar. 4, 1997

[54] METHOD OF PROCESSING DATA STRINGS

[75] Inventors: Robert M. Dinkjian, Woodstock; Lisa C. Heller, Saugerties; Steven R. Kordus, Kingston; Kenneth A. Lauricella, Hurley; Thomas W. Seigendall, Saugerties, all of N.Y.; Robert A. Skaggs, Manassas, Va.; Nelson S. Xu, Hyde Park, N.Y.

[73] Assignee: International Business Machines Corporation, Armonk, N.Y.

[ * ] Notice: The term of this patent shall not extend beyond the expiration date of Pat. No. 5,465,374.

[21] Appl. No.: 460,347

[22] Filed: Jun. 2, 1995

Related U.S. Application Data

[62] Division of Ser. No. 3,369, Jan. 12, 1993, Pat. No. 5,465,374.

[51] Int. Cl.$^6$ ............................................. G06F 7/00
[52] U.S. Cl. .................... 395/375; 395/800; 395/821; 395/824; 395/872; 395/402; 364/DIG. 1; 364/259.8; 364/259
[58] Field of Search ....................... 395/800, 375, 395/821, 284, 872, 402; 364/DIG. 1, 238.6, 238.7

[56] References Cited

U.S. PATENT DOCUMENTS

| | | | |
|---|---|---|---|
| 3,717,851 | 2/1973 | Cocke et al. | 395/375 |
| 3,739,352 | 6/1973 | Packard | 395/421.04 |
| 4,109,310 | 8/1978 | England et al. | 395/375 |
| 4,326,290 | 4/1982 | Davis et al. | 371/22.1 |
| 4,620,274 | 10/1986 | Boothroyd et al. | 395/375 |
| 4,920,483 | 4/1990 | Pogue et al. | 395/421.09 |
| 5,053,953 | 10/1991 | Patel | 395/375 |
| 5,056,041 | 10/1991 | Guttag et al. | 395/518 |
| 5,060,147 | 10/1991 | Mattheyses | 395/650 |
| 5,073,864 | 12/1991 | Methvin et al. | 364/715.11 |
| 5,185,859 | 2/1993 | Guttag et al. | 395/164 |
| 5,465,374 | 11/1995 | Dinkjian et al. | 395/800 |

*Primary Examiner*—Meng-Ai T. An
*Assistant Examiner*—Dzung C. Nguyen
*Attorney, Agent, or Firm*—Varnum, Riddering, Schmidt & Howlett LLP; Lynn L. Augspurger

[57] ABSTRACT

A data processor processes data strings from memory where the data strings do not begin or end at a memory boundary. A string is defined in memory by a starting address, a byte count defining the total number of bytes in the string, and a byte offset defining the position of the first byte in the starting address location. The processor stores the byte count and decrements the byte count as each multi-byte word is processed. A byte count mask circuit generates a byte count mask which has all 1s for each byte count greater than the number of bytes per memory word. When the number of bytes remaining to be processed is below the number of bytes in a memory word, the byte count mask generates 1s only for the positions corresponding to the positions of bytes of the string in the last memory word. An offset register stores the offset defining the position of the first byte in the first memory word of the string. The offset is used to shift the byte count mask by a number of positions corresponding to the position of the first byte of the string and inserts 0s in the byte count mask for positions not belonging to the string. A byte-by-byte comparator determines string end conditions and provides an output word with a significant bit indication for each byte for which an end condition has been detected. The output of the byte-by-byte comparator is combined with the shifted byte count mask, and the result is decoded by means of a prioritized decoder which generates a string write mask.

3 Claims, 7 Drawing Sheets

TABLE A.
Byte-by-Byte Comparator

```
X Y Z         A, B, C
0 0 0         A = B ≠ C
0 0 1         A ≠ C, A < B
0 1 0         A ≠ C, A > B
0 1 1         A ≠ C, A < B and B = C
1 0 0         A = B = C
1 0 1         A = C < B
1 1 0         A = C > B
1 1 1         (not used)
```

*Fig. 6*

TABLE B.
End Condition mask

| End Condition | | mask | |
|---|---|---|---|
| 80 - FF | (128-255) | 80 | (128) |
| 40 - 7F | (64-127) | C0 | (192) |
| 20 - 3F | (32-63) | E0 | (229) |
| 10 - 1F | (16-31) | F0 | (240) |
| 08 - 0F | (8-15) | F8 | (248) |
| 04 - 07 | (4-7) | FC | (252) |
| 02 - 03 | (2-3) | FE | (254) |
| 00 - 01 | (0-1) | FF | (256) |

*Fig. 7*

TABLE C.

$X_i = 1$ if $A_i = C_i$
$Y_i = 1$ if $A_i > B_i + (B_i = C_i \quad A_i \neq c_i)$
$Z_i = 1$ if $A_i < B_i$

*Fig. 8*

TABLE D.

| | Byte Count | | Byte Count Mask |
|---|---|---|---|
| 1 | 0000000 | ---------------------------------- | 10000000 |
| 2 | 0000001 | ---------------------------------- | 11000000 |
| 3 | 0000010 | ---------------------------------- | 11100000 |
| 4 | 0000011 | ---------------------------------- | 11110000 |
| 5 | 0000100 | ---------------------------------- | 11111000 |
| 6 | 0000101 | ---------------------------------- | 11111100 |
| 7 | 0000110 | ---------------------------------- | 11111110 |
| 8 | 0000111 | ---------------------------------- | 11111111 |
| ⋮ | ⋮ | | ⋮ |
| 256 | 1111111 | ---------------------------------- | 11111111 |

*Fig. 9*

|  | 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|---|
| 00,01 | | | | | | 1 | 2 | 3 | 4 | -- | -- | -- | -- | -- | -- | 11 |
| 24,25 | 188 | -- | -- | -- | -- | -- | -- | 195 | 196 | 197 | 198 | 199 | 200 | | | |

*Fig. 10*

METHOD OF PROCESSING DATA STRINGS

This is a division of application Ser. No. 08/003,369 filed Jan. 12, 1993, now U.S. Pat. No. 5,465,374.

BACKGROUND OF THE INVENTION

1. Field of the Invention

The invention relates to data processing systems and more particularly to processors which process data strings in a data processor system.

2. Prior Art

Data processing systems are designed to operate on data stored in memory and to perform a variety of operations with respect to the data. Data is typically stored in memory in the form of data words which may be several bytes in length, e.g., eight bytes of eight binary bits each. Certain types of data is presented in the form of a data string which comprises a number of bytes, oftentimes greater than the number of bytes that can be stored in a single memory word, and the number of bytes in a string are not necessarily a multiple of the number of bytes in a memory word. Thus, a string may fully occupy some memory words and partially occupy another. Furthermore, for purposes of saving the memory space and for convenience to programers, it is desirable not to require that a data string start at the beginning of a memory word or end at the end of a memory word. Under those conditions, the beginning portion of a data string may partially occupy one memory word location and the ending portion of the string may partially occupy another memory word location.

There are a number of known processor instructions for manipulating data strings such as the MOVE instruction which causes the data string to be moved from one memory location to another; the SEARCH instruction which searches the contents of the memory string for certain predefined conditions; and COMPARE instructions which compare the bytes in two separate strings to determine equality conditions. A data string is typically defined by a starting address and data defining the number of bytes in the string. String manipulation, by means of such instructions as mentioned above, may be executed by the use of a program subroutine which takes into account the memory word boundary conditions during manipulation of the string. However, such software manipulation is rather complex and therefore time consuming to the data processor. It is therefore desirable to provide an alternative in which data strings may be processed more efficiently.

SUMMARY OF THE INVENTION

These and other problems of the prior art are overcome in accordance with the present invention by providing hardware internal to a data processor for rapidly executing data string manipulation instructions.

In accordance with one aspect of the invention, a data processor comprises end condition detection circuitry generating a multi-bit output word in which certain bits are significant condition bits defining the presence of an end condition for a correspondingly positioned byte of data read from memory. A mask circuit generates a mask having significant condition bits indicating bytes of the data word belonging to the data string and logic circuitry generates a multi-bit end condition output word defining bytes of the data word and belonging to the data string for which an end condition has been detected. A further mask circuit generates an output mask defining only bits of the end condition output word up to and including the first significant condition bit of the end condition output word. A second logic circuit generates a multi-bit output word having a significant bit in the position corresponding to the first byte in the data word representing an end condition and significant bits representing all other bytes belonging to the string and positioned between the first end condition byte and one end of the data word.

In one embodiment of the invention, the end condition detection circuitry provides an end condition indication when a byte of the data string is an end character. In another embodiment of the invention, the data processor reads a plurality of bytes of each of a pair of strings, and upon comparison of correspondingly positioned bytes of the two strings, generates an end condition output word defining equality conditions, e.g., equal, not equal, less than, greater than, of corresponding bytes of the two strings.

Advantageously, in accordance with this invention, a data string processing arrangement does not require that data strings are started or ended on a memory word boundary, thereby significantly reducing memory space required for string storage and simplifying memory loading procedures. Furthermore, time-consuming software string manipulation is avoided.

DETAILED DESCRIPTION OF THE DRAWING

An illustrative embodiment of the invention is described below with reference to the drawing in which.

Figure 1:
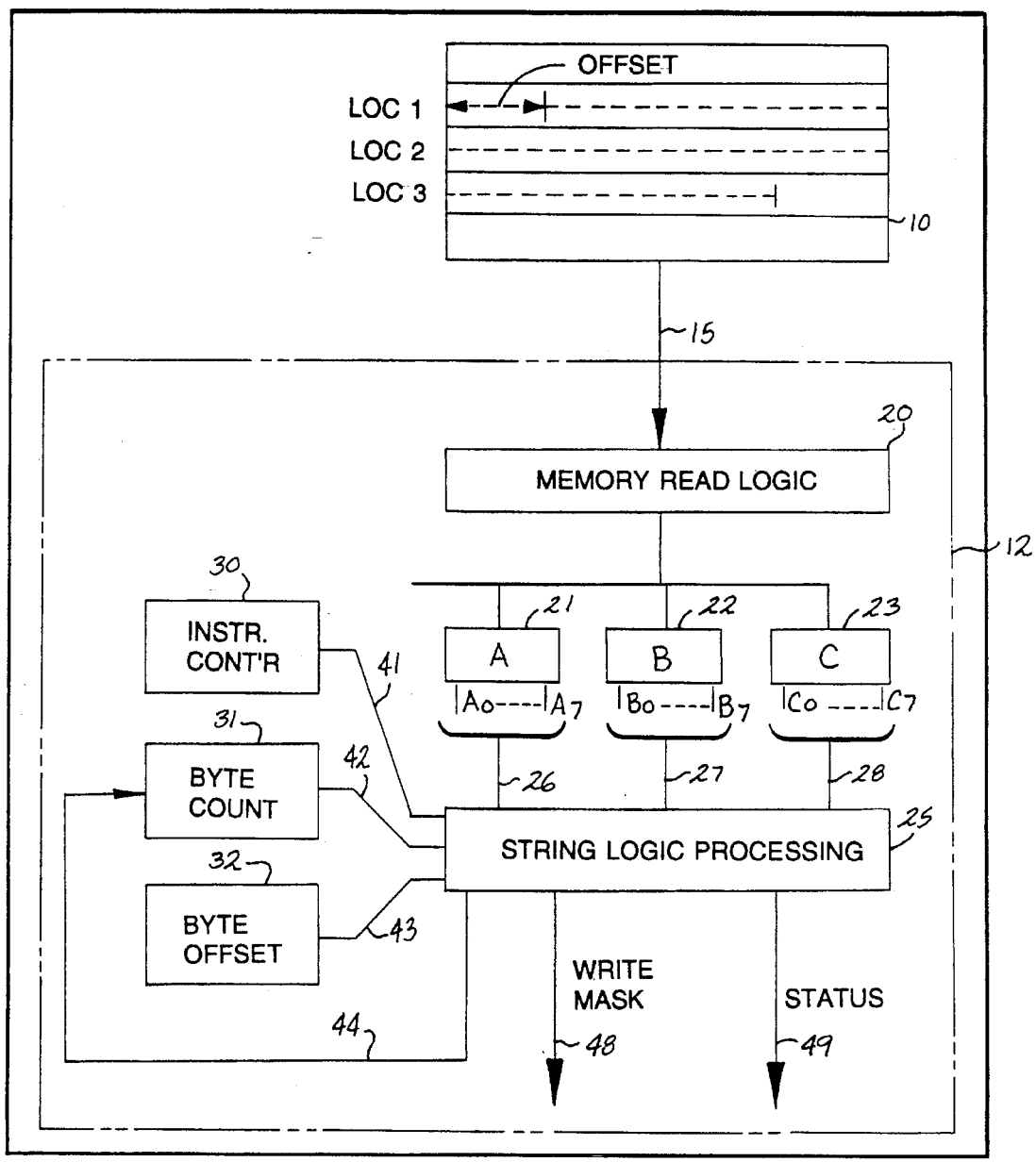
FIG. 1 is a block diagram representation of a computer system incorporating the principles of the invention.
Figure 2:
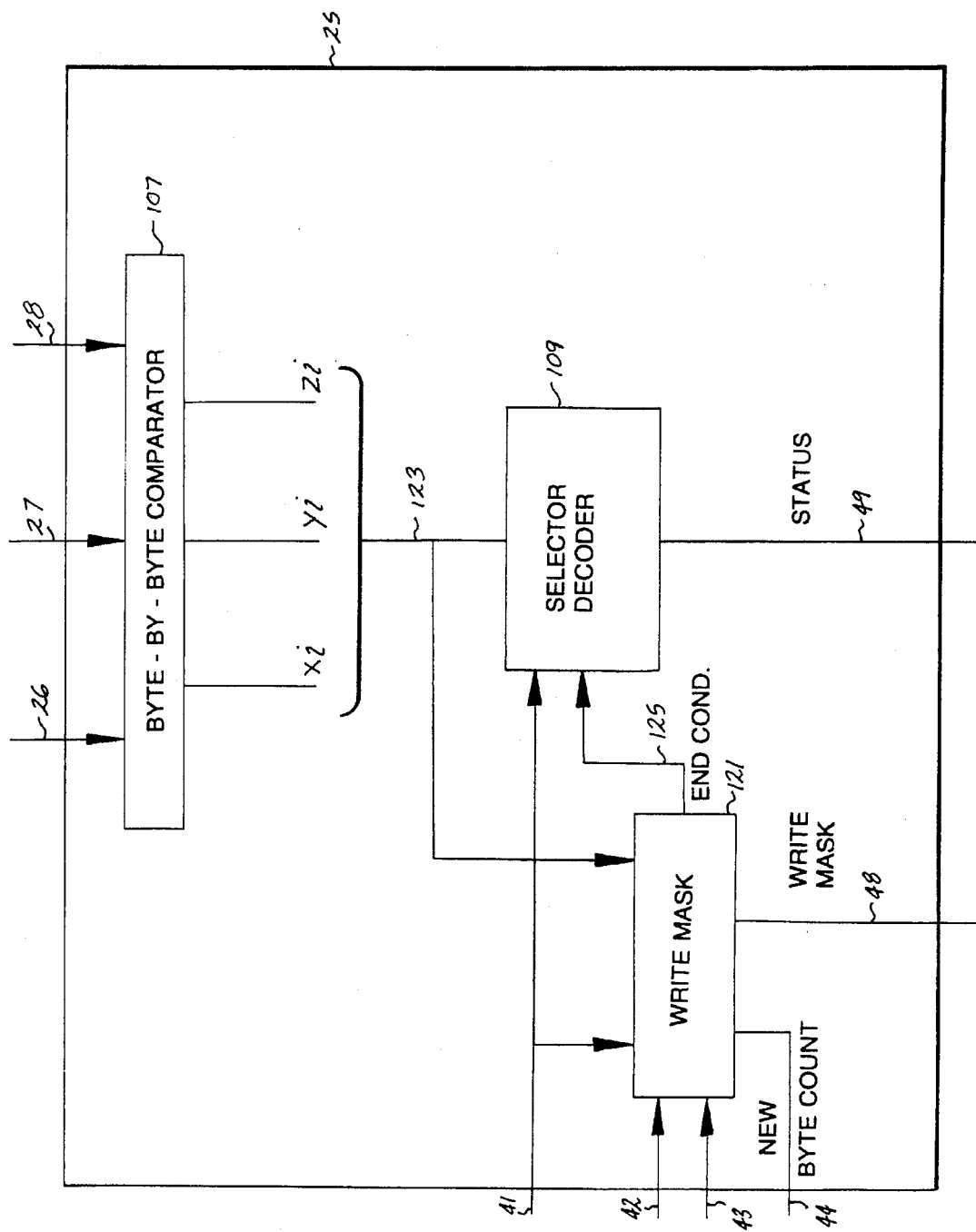
FIG. 2 is a more detailed block diagram representation of string processing logic circuitry of FIG. 1.
Figure 3:
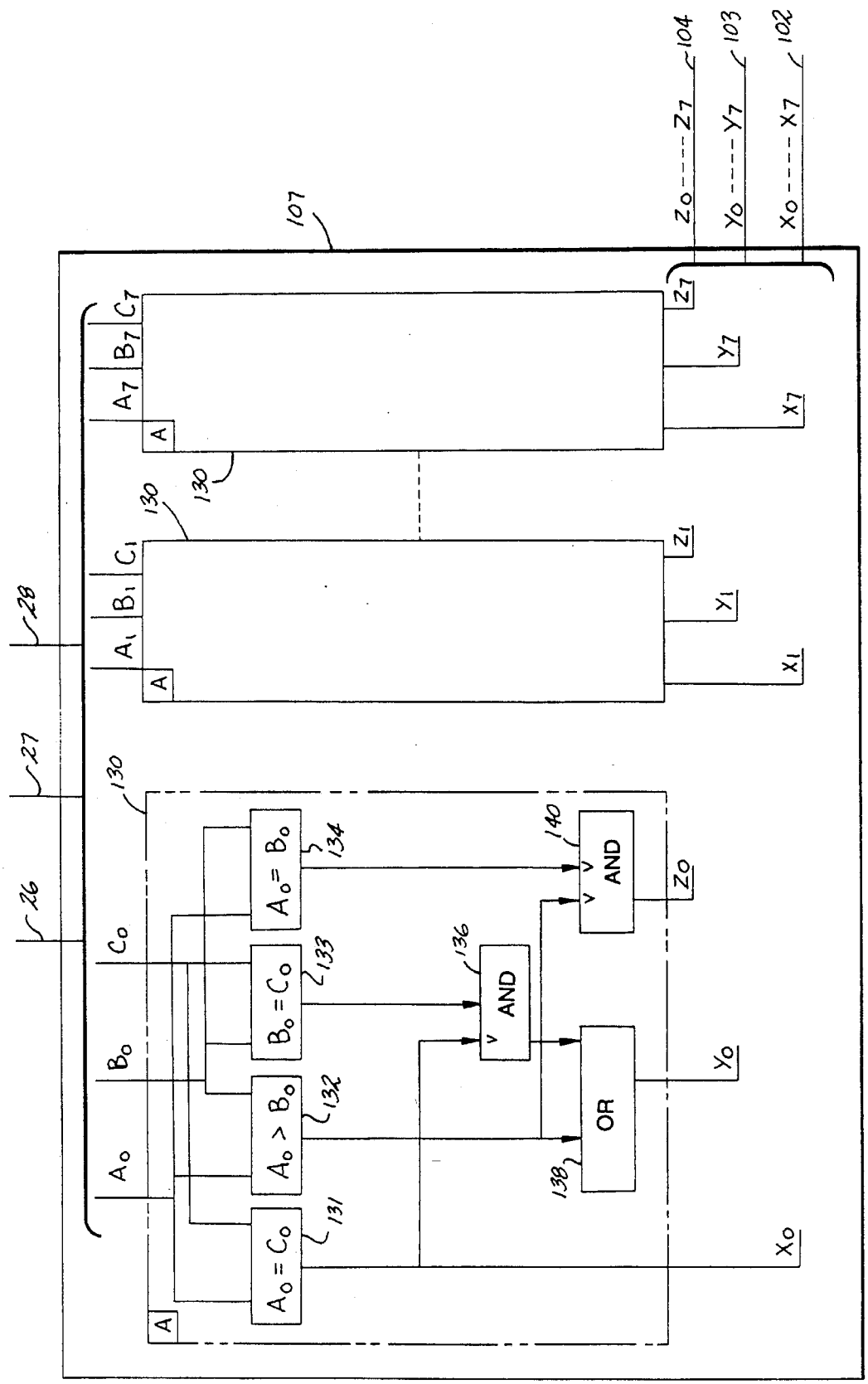
Figure 4:
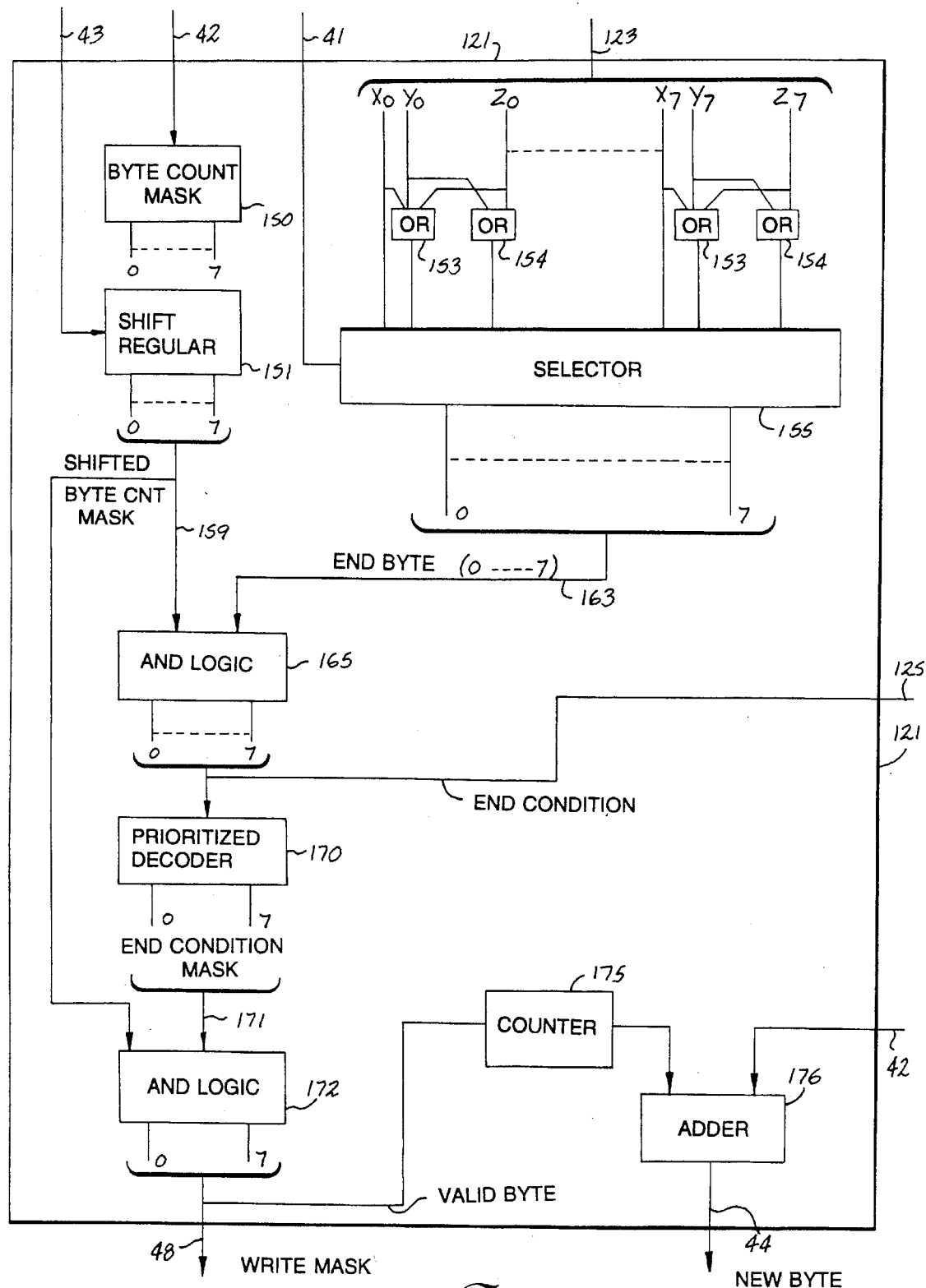
Figure 5:
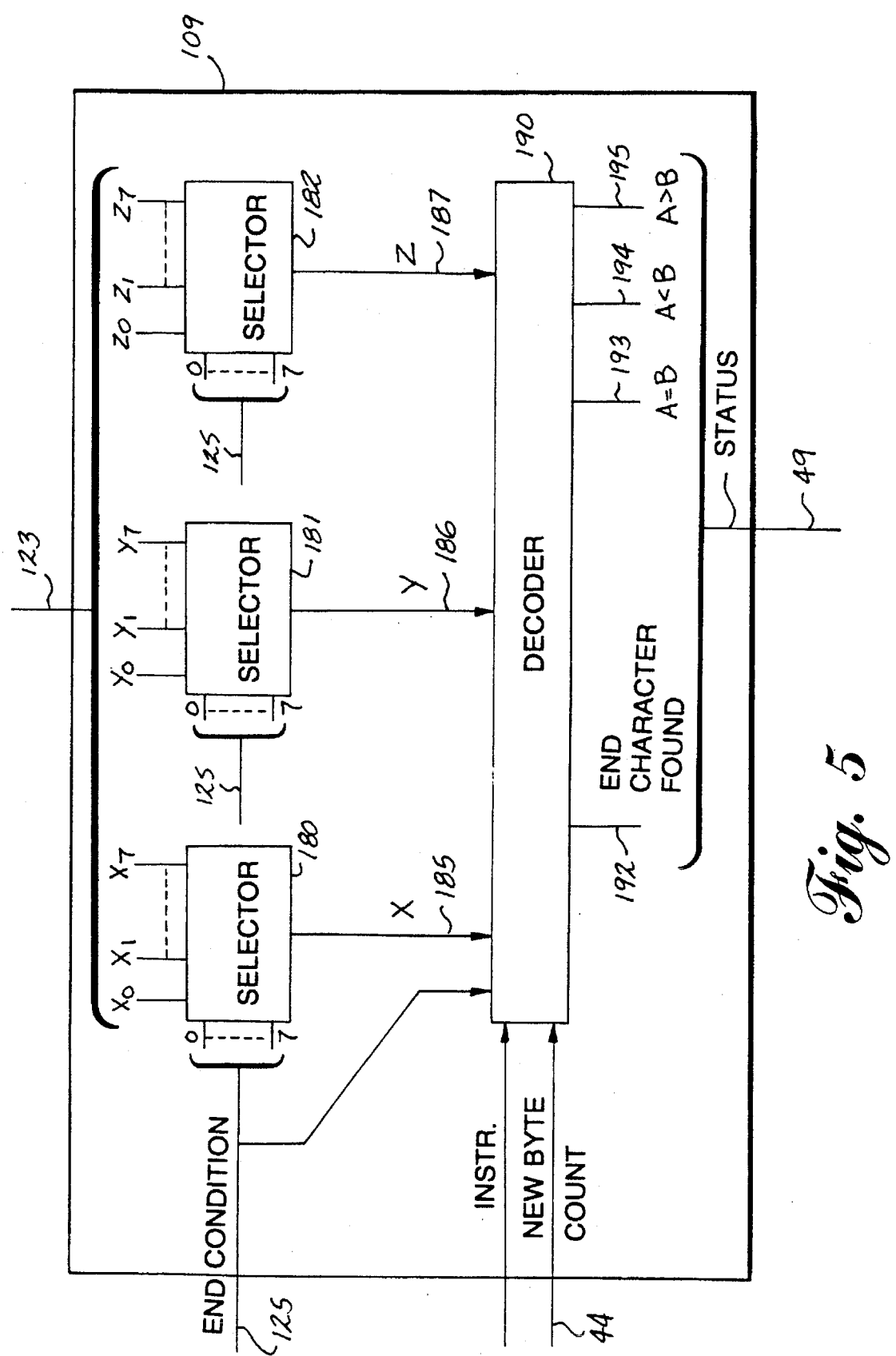

FIGS. 3, 4, and 5 are more detailed block diagram representations of logic circuitry of FIG. 2;

FIGS. 6, 7, 8 and 9 are tables expressing logical relationships of signals generated within the processor system of FIG. 1; and FIG. 10 is a layout of a multi-byte data string in the memory of FIG. 1.

DETAILED DESCRIPTION

FIG. 1 is a high-level block diagram representation of a computer system including a memory of 10 and a central processing unit (CPU) 12. The CPU 12 communicates with the memory unit 10 by means of a memory bus 15. Data is stored in the memory 10 in a plurality of individually addressable locations referred to as memory words. The CPU 12 processes data on the basis of data bytes, with each byte containing eight binary data bits. Each memory word contains several such bytes of data. A data string consists of a plurality of associated data bytes, all of which may be stored in one memory word or in several contiguous data words, depending on the length of the string. Data strings are defined by a starting address and a byte count indicative of the length of the string. A string may also include an end character defining the end of the string.

String manipulation instructions such as MOVE, COMPARE, and SEARCH operate on data strings in storage. Such instructions typically process the strings on a byte-by-byte basis.

The MOVE instruction moves a data string from a specified location to another location in memory. The COMPARE instruction compares two data strings in memory on a byte-by-byte basis. The SEARCH instruction searches a data string for a specified sequence of data bits. In the system of this invention a data string does not necessarily start or end on a word boundary. The start of the data string is defined by a starting memory word address in which the first byte of the string is stored. An offset indicates the position of the first byte in the starting memory word. An end character in the last byte of the string identifies the end of the string.

The string manipulation instructions are executed by means of the processor 12 by first reading the eight-byte memory word defined by the starting address. In the system accorded with the invention, the processor 12 is provided with an A register, a B register and a C register, 21, 22 and 23, respectively, each eight bytes in length. The A register holds up to eight bytes of a string for the MOVE and SEARCH instructions and a first operand for the COMPARE instruction. The B register holds up to eight bytes of a second operand for the COMPARE instruction, and the C register holds the predefined end character, replicated eight times.

String processing logic 25 processes the strings in the CPU 12. An instruction controller 30 is connected to the processing logic 25 to differentiate between processing for the MOVE, SEARCH, and COMPARE instructions. The byte count specifying the number of bytes to be processed in this string, if no other ending conditions are reached, is stored in a byte count register 31. An offset value representing the starting point of the first useful byte in the starting memory location is defined by the contents of a byte offset register 32.

FIG. 2. is a block diagram representation of the string processing logic 25 of FIG. 1. The string processing logic 25 receives inputs from the A, B and C registers, 21, 22 and 23, on conductors 26, 27 and 28, respectively, and from the instruction controller 30, the byte count register 31 and the byte offset register 32 (FIG. 1) on conductors 41, 42 and 43, respectively. A byte-by-byte comparator 107 receives the eight-byte contents of the A, B, and C registers on cables 26, 27, and 28, respectively, and generates a set of three output signals Xi, Yi, Zi on cable 123 for each of the eight bytes in the A, B, and C registers 21, 22, 23. Each of the X, Y, and Z output signals represents a logical combination of corresponding bytes of one or more of the A register, B register, and C register defining equality conditions (equal, not equal, less than, greater than) of corresponding bytes of these registers. Specifically, the eight Xi signals are 1 if and only if the i-th byte of the A register is the end character; the eight Yi signals are 1 if and only if the i-th byte of the A register is greater than the i-th byte of the B register or if the i-th byte of the B register is equal to the end character while the i-th byte of the A register is not; the eight Zi signals are 1 if and only if the i-th byte of the A register is less than the i-th byte of the B register. This relationship is also shown by equations in Table C, FIG. 8. The specific logic for implementing the byte-by-byte comparator 107 is described later herein with reference to FIG. 3.

The signals Xi, Yi and Zi are applied to the write mask circuit 121 via cable 123. This circuit is responsive to these inputs and an input from the instruction controller 30 on conductor 41 to generate an output signal on cable 125 referred to as END COND and indicative of an end condition detected in a data string being processed. This signal is in the form of a multi-bit mask which defines those bytes of the A register for which a valid end condition has been detected. The selector decoder 109 is responsive to this end condition signal on cable 125 and an output from the instruction controller 30 on conductor 41 to generate a status output on output 49 which includes an end-of-string character indication as well as an indication of comparison between the A and B registers for COMPARE instructions. The output of the instruction controller 30 on conductor 41 is used in both the write mask circuit 121 and selector/decoder 109 since different functions are to be performed by these circuits for COMPARE instructions than for the MOVE and SEARCH instructions. The write mask circuit 121 is responsive to the instruction controller input on conductor 41 and outputs from the byte count register 31 and the byte offset register 32 on conductors 42 and 43 respectively, to generate a write mask on cable 48. This write mask is an eight-bit mask that reflects the number of bytes and the position of the bytes of the string processed in the current iteration. Each bit in the write mask represents a byte of the eight-byte A register. The write mask is used in the MOVE instruction to write the data string into a new memory location. The write mask generator 121 further generates an output on conductor 44 which is the new byte count to be entered in the byte count register 31, as is described later herein with reference to FIG. 4. In this manner, the byte count register is updated to accurately reflect the number of bytes left to be processed.

FIG. 3 is a more detailed block diagram representation of the byte-by-byte comparator 107 of FIG. 2. Outputs from the A, B and C registers, identified as A0 through A7, B0 through B7 and C0 through C7, respectively, are applied to logic circuits 130. The designations A0 through A7, B0 through B7 and C0 through C7 refer to bytes 0 through 7 of the respective eight-byte registers. There are eight logic circuits 130 in the comparator 107, with the first logic circuit receiving byte 0 of the three registers and the next logic circuit receiving byte 1 of the three registers, etc., with the last of the logic circuits receiving byte 7 of the three registers. Each of the circuits 130 generate an X, Y, and Z output signal with the leftmost one of the circuits 130 shown in FIG. 3 generating bits X0, Y0 and Z0 and the other circuits generating bits X1, Y1, Z1 through X7, Y7, Z7. The relationship of Xi, Yi, Zi to bytes Ai, Bi, and Ci is shown in Table C (FIG. 8).

The logic circuits 130 are identical in structure and only one of the circuits is shown in greater detail. Each of the circuits 130 has four well-known byte-by-byte comparator circuits 131 through 134. The output of comparator 131 is a logical 1 when byte A0 is equal to byte C0; comparator 132 output is a logical 1 when byte A0 is greater than byte B0; comparator 133 output is a logical 1 when byte B0 is equal to byte C0; and comparator 134 output is a logical 1 when byte A0 is equal to byte B0.

As can be readily seen from the drawing, the output X0 is a logical 1 if A0 is equal to C0. The outputs of comparators 131 and 133, individually indicating that A0 is equal to C0 and B0 is equal to C0, are applied to an AND circuit 136 with the input from logic circuit 131 being inverted. Accordingly, the output of circuit 136 indicates that A0 is not equal to C0 and B0 is equal C0. The output of AND circuit 136 is applied to OR circuit 138 together with the output of comparators 132 which indicates that A0 is greater than B0. Accordingly, the output Y0 is a logical 1 whenever A0 is greater than B0 or, B is equal to C0 and A0 is not equal to C0. The output of logic circuits 132 and 134 are applied to AND circuit 140 and both inputs are inverted. Accordingly, the output Z0 is a 1 when A0 is not equal to B0 and A0 is not greater than B0. This is equivalent to the statement that A0 is less than B0.

FIG. 4 is a more detailed block diagram representation of the write mask circuit 121 of FIG. 2. The write mask circuit includes a byte count mask circuit 150 which produces an eight-bit output mask having a number of 1s corresponding to the byte count in the byte count register 31 of FIG. 1 to which this circuit is connected by means of conductor 42. The relationship between the byte count in register 31 and the mask output circuit 150 is shown in tabular form in Table D, FIG. 9. The byte count in register 31 initially represents the number of bytes in the string to be processed. This number is decremented as bytes are processed and therefore represents the number of bytes to be processed at each stage of string processing. The byte count mask is used together with the contents of the Byte offset register 32 to define the position of the first and last bytes of a data string. Since a data word does not necessarily start or end on a word boundary, the byte count and offset are used to provide a mask which allows only those bytes of a memory word belonging to the data string to be processed. String processing is performed in sequential order from left to right, from the lowest numbered byte to the highest. By way of example, FIG. 10 depicts a memory layout of 13 double word memory locations of 16 bytes each, for storing 26 eight-byte words. A data string having its first byte, byte 1, in byte position 5 of the first word and having the last byte, byte 200, in byte position 4 of the 26th word, is depicted in FIG. 10. In this example, the byte count in register 31 is initially 200 and the offset in register 32 is 5. When memory data word 00 is loaded into register A, the byte count is 200 and the eight-bit byte count mask is all 1s, as depicted in Table D, FIG. 9.

The byte count mask produced by the circuit 150 is applied to a shift register 151 wherein the entire mask is shifted to the right by an amount defined by binary bits on the conductor 43 which represent the contents of the byte offset register 32. The shift is made to the right and 0s are inserted at the left as the content is shifted to the right. Thus, in the example of FIG. 10 where the offset is equal to 5, the byte count mask is shifted to the right by five positions and 0s are inserted in the leftmost five positions. Accordingly, the resultant mask has 1s only in positions corresponding to bytes 1, 2 and 3 of the data string. For all subsequently read memory words after the first memory word in the string, the offset is 0. The byte count is decremented with each subsequently processed group of bytes and the byte count mask is not affected by the offset. For the next 24 eight-byte words read from memory, the byte count, at the time the next word is read, will be greater than 8. When the 25th word, i.e., the last word containing bytes of the string, is read, the byte count will be 5 (i.e., 200–195). The corresponding byte count mask, as shown in FIG. 9, will have 1s in the five leftmost positions, corresponding to the five positions of the last word containing bytes belonging to the string.

FIG. 4 includes a selector 155 which receives inputs which are functions of signals X0, Y0, Z0 through X7, Y7, Z7 on cable 123 and an input from the instruction controller 30 on conductor 41. In each case, the Xi bit is a one when the corresponding byte defines the end character, i.e., $A_i=C_2$. Therefore, the Xi lead is used as a direct indication of the presence or absence of an end condition for the MOVE or SEARCH instructions, which use only the A register 21. As can be seen from Table A in FIG. 6, other combinations of X, Y, and Z can be used with COMPARE instructions to determine whether corresponding bytes of the A register 21 and the B register 22 are equal or unequal and whether either of these is equal to the end character in the C register 23. The particular coding shown in Table A of FIG. 6 is not unique and other codings may be used.

An end condition in this context is defined as the condition wherein byte $A_i$ equals $C_i$, i.e., the end character, or wherein $A_i$ is not equal to $B_i$ in a COMPARE instruction. For each set of Xi, Yi, Zi inputs, a pair of OR circuits 153, 154 are provided. Circuit 153 provides a logical output equal to Xi or Yi or Zi, and circuit 154 provides a logical output Xi or Zi. The selector 155, in accordance with instruction control signals on conductor 41 selects the Xi input for MOVE and SEARCH instructions and selects the outputs of OR circuits 153, 154 for different COMPARE instructions. As can be seen with reference to Table A, FIG. 6, the Xi or Yi or Zi case represents all conditions except $A_i=B_i\neq C_i$ and Xi or Yi represents $A_i\neq B_i$.

The output of the selector 155 is an eight-bit word with a bit corresponding to each of the eight bytes of a word being processed and a logical one indicating when the corresponding byte represents an end condition. In the AND logic 165, the eight-bit word from the selector 155 is ANDed with the eight-bit mask of shift register 151. The function of the AND logic 165 is to mask off irrelevant bits as determined from the byte count and the offset by means of the byte count mask circuit 150 and the shift register 151, as discussed earlier herein. An end condition mask is generated in the decoder 170 in accordance with Table B (FIG. 7). The Table B indicates the bit positions of the end conditions and the corresponding mask in hexadecimal notation. The corresponding decimal numbers are indicated in parentheses. The decoder 170 is a prioritized decoder which finds the leftmost 1 and produces an output mask word with all 0s to right of the leftmost 1. In the AND logic 172 an eight-bit output signal, VALID BYTE 0 through VALID BYTE 7 is created by ANDing the end condition mask on cable 171 with the shifted byte count mask on cable 159. Since the latter identifies bytes of the string, the resultant output of AND logic 172 is an eight-bit word identifying exactly those bytes that participated in the current processing iteration of the string instruction. This output is used on output 48 as a write mask for the MOVE instruction when the string is stored in a new location. The output 48 is also used in arithmetic logic circuitry such as counter circuit 175 which counts the number of 1s in the eight-bit write mask, since this indicates the number of bytes in the current iteration of the string instruction. By means of an adder 176, this number is subtracted from the byte count number transmitted from the byte count register 31 on conductor 42. The resultant output of adder 176 is the new byte count and this value is inserted in the byte count register 31 via conductor 44.

FIG. 5 is a more detailed representation of the selector/decoder circuit 109 of FIG. 2. The selected decoder circuit 109 comprises an X selector 180, a Y selector 181, and a Z selector 182. The selectors 180, 181, and 182 are prioritized selectors. Each of the selectors has its input the eight-bit end condition word from write mask circuit 121, cable 125, and an eight-bit X, Y, or Z word on cable 123. These X, Y, Z signals are generated from the A register, B register and C register bytes and define the end condition. Each prioritized selector identifies the position of the leftmost 1 of the end condition word and generates an X, Y or Z output signal, on conductors 185 through 187, which corresponds to one of the X, Y, or Z inputs defined by the leftmost 1. By way of example, if the first 1 in the end condition word is at position 2, the X2, the Y2, and the Z2 inputs will be reproduced on the output conductors 185 through 187.

A decoder circuit 190 receives the 7 bit word defining the end condition from the write mask circuit 121 on cable 125. It also receives an input from the instruction controller 30 on conductor 41. If the end condition on cable 125 is all 0s, no data-dependent terminating condition has been reached. However, if the end condition is non-zero or the new byte count on conductor 44 equals 0, then the instruction should terminate on the Current iteration. For the MOVE and SEARCH instructions only the X value has meaning and when the selected X input value on conductor 185 is a 1, the end character output on conductor 192 is activated. Outputs on conductors 193, 194, and 195 indicate whether A is equal to B, A is less than B, or A is greater than B, respectively. The relationships of A with respect to B can be readily derived from the Xi, Yi, Zi signals as shown in Table A (FIG. 6). It will be apparent from Table A, that A is equal B when Y and Z are both 0, A is less than B when Z is equal to 1, and A is greater than B when Y is equal to 1, and Z is equal to 0. The output of decoder 190 represents the status information on conductor 49 of FIG. 1.

It will be understood that the above-described embodiment is only illustrative of the principles of the invention and that other embodiments may be devised by those skilled in the art without departing from the spirit and scope of the invention.

What we claim is:

1. A method of processing data strings in a data processor comprising a memory having a plurality of multi-byte data word locations with each data word location having a predefined memory address and comprising a plurality of byte locations, the method comprising the steps of:

storing a data string in the memory beginning at a starting data word location and storing a first byte of the data string at a predefined byte location in the starting data word location;

providing an offset value defining the predefined location of the first byte of the data string in the starting data word location;

generating a byte count mask defining position in the data string of a byte being processed;

reading a data word containing at least one byte of the data string from the memory into a data register;

combining the offset value together with the byte count mask to define a position of a first byte and of a last byte of the string in the memory.

2. The method in accordance with claim 1 and further comprising the step of processing a byte read from memory and the step of combining the offset value and the byte count mask to generate a write mask defining a position of a processed byte in a memory word location.

3. The method in accordance with claim 1 and further comprising the step of detecting an end condition defining a last byte in a string and the step of combining the byte mask with the offset value to define the position of the end byte in a memory data word location.

* * * * *